United States Patent
Weatherford

(10) Patent No.: US 7,039,940 B2
(45) Date of Patent: May 2, 2006

(54) METHOD AND SYSTEM FOR DISTRIBUTING VIDEO CONTENT OVER A NETWORK

(76) Inventor: Clay Alan Weatherford, 3601 Wilson, Austin, TX (US) 78704

( * ) Notice: Subject to any disclaimer, the term of this patent is extended or adjusted under 35 U.S.C. 154(b) by 1051 days.

(21) Appl. No.: 09/946,043

(22) Filed: Sep. 4, 2001

(65) Prior Publication Data
US 2003/0046684 A1    Mar. 6, 2003

Related U.S. Application Data

(60) Provisional application No. 60/230,953, filed on Sep. 7, 2000.

(51) Int. Cl.
- H04N 7/173   (2006.01)
- H04N 7/16    (2006.01)
- H04N 9/00    (2006.01)

(52) U.S. Cl. ............... 725/112; 725/8; 725/9; 725/86

(58) Field of Classification Search ........... 725/8–9, 725/13, 97, 24, 34–36, 86, 112
See application file for complete search history.

(56) References Cited

U.S. PATENT DOCUMENTS

| | | | |
|---|---|---|---|
| 5,483,278 A * | 1/1996 | Strubbe et al. | 725/61 |
| 5,664,046 A * | 9/1997 | Abecassis | 386/125 |
| 5,694,162 A * | 12/1997 | Freeny, Jr. | 725/116 |
| 5,861,881 A * | 1/1999 | Freeman et al. | 715/500.1 |
| 5,884,282 A * | 3/1999 | Robinson | 705/27 |
| 6,260,194 B1 * | 7/2001 | Shiels et al. | 725/134 |
| 6,314,568 B1 * | 11/2001 | Ochiai et al. | 725/34 |
| 6,594,699 B1 * | 7/2003 | Sahai et al. | 709/228 |
| 6,792,618 B1 * | 9/2004 | Bendinelli et al. | 725/112 |

* cited by examiner

*Primary Examiner*—John Miller
*Assistant Examiner*—Chris Parry
(74) *Attorney, Agent, or Firm*—Sidney L. Weatherford

(57) ABSTRACT

Content with a plurality of treatments, in the form of a movie, video, text, animation, music, etc., is stored on a network, each treatment having a storyline connection with all the other treatments. Subscribers to the content are classified in a subscriber tier based on subscription fee amounts. A top-level tier is capable of choosing a first and second sub-set of elements of a main presentation, e.g. a movie. The elements, in the example of a movie, may include characters and movie genre. Each subscriber's choice, within a tier, is registered and the majority of the top level determines a first element in the movie. Each subscriber in the second highest level is able to adjust the storyline, which includes a first element determined by the first tier, by choosing a second element. A further tier of subscribers views the content as determined by the higher level tiers.

18 Claims, 4 Drawing Sheets

METHOD AND SYSTEM FOR DISTRIBUTING VIDEO CONTENT OVER A NETWORK

CROSS-REFERENCE TO RELATED APPLICATIONS

This Application claims priovider 35 U.S.C. 119 to Provisional Application Ser. No. 60/230,953, filed Sep. 7, 2000 by the present inventor, the entire content of which is cooperated herein by reference.

BACKGROUND OF THE INVENTION

1. Technical Field

The present invention relates in general to audio/video content and in particular, access to audio/video content via a network. More particularly, the present invention relates to distributing audio/video content on the Internet.

2. Description of the Related Art

Many web sites on the Internet are referred to as content providers. Content is a general term that refers to music, movies, games on-line books, information, audio/video, etc. A content provider is generally, a company that supplies content to the Internet. The content carrier is the communications providers or the transmission medium by which the content is moved from the content provider to a user.

The Internet has become an integral part in the way in which content is delivered to end users. For example, newspapers, magazines, television and cable networks have web sites that are increasingly being used to deliver content. Content is delivered by on-line content providers which include, for example, web sites and on-line service providers such as AOL™.

Content is accessed by end users via on-line access devices. The on-line access device most often used currently is the personal computer. However, non-personal-computer on-line access devices are being, and have been, developed that enable end users to connect to the Internet. For example, one type of non-personal-computer on-line access device is a web television. Another is a special cell phone that has web navigating capabilities. Still another is a laptop computer that has a wireless modem.

A problem that is common to all the devices is the problem of the content itself. There is only one way to transmit content to a user, and that is to send via the Internet, a beginning, middle and ending of a single presentation—all specified by the content supplier. There are web sites that a user may participate by chatting and maybe voting about a single presentation. There are web sites, usually search engine sites such as Yahoo™, MSN™, Go.com™, that provide particular addresses and "channels" for transmitting content. At present, there is no ability for a user to manipulate content of the presentation so that the content is tailored to an individual user's desires.

Therefore, it would be desirable to provide a system and method that would allow individual manipulation of content via a network or the Internet.

SUMMARY OF THE INVENTION

It is therefore one object of the present invention to provide a method and system for transmitting video content to subscribers via a network.

It is another object of the present invention to provide a method for allowing content subscribers to choose different video segments within a single, complete presentation.

It is yet another object of the present invention to provide a method and system for an Internet content provider to provide a service that allows different tiers of subscribers to dictate the direction of the content of broadcast segments.

It is still another object of the present invention to provide a method and system for allowing content control by subscribers utilizing paid subscriptions in a tiered system.

The foregoing objects are achieved as is now described. Content, in the form of a movie, text, cartoon, music, etc., is expanded into a plurality of treatments wherein each treatment has at least some relation with all other treatments. Subscribers to the content are segregated into tiers based on fee amounts. Each tier has a prescribed number of choices of a set of elements to determine course of the content. A top-level tier is capable of choosing a first and second sub-set of elements of a main presentation, e.g. a movie. The sub-sets, in the example of a movie, include characters and genre. Each subscriber's choice, within a tier, is registered and the majority of the top level determines a first element in the movie. Each subscriber in the second highest level is able to adjust the storyline, which includes the first element, by choosing a second element. Additional tiers of subscribers are not allowed to adjust the story line. A complete set of story lines, with all combinations is stored on a server.

Subscribers login to the server via the web. Top tier subscribers have access to a complete list of all story line combinations; second tier subscribers have access to a second level of story line combinations and bottom tier subscribers have access only to the subset. The choices that are made by the tier one and tier two subscribers are monitored and the story line choices in both tiers with the highest number of choices are determined in the first 20 seconds of a presentation period. The storyline with the highest rating, as determined by the tier one and tier two subscribers, is made available to the bottom tier. The level of subscription fees determines tier status.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
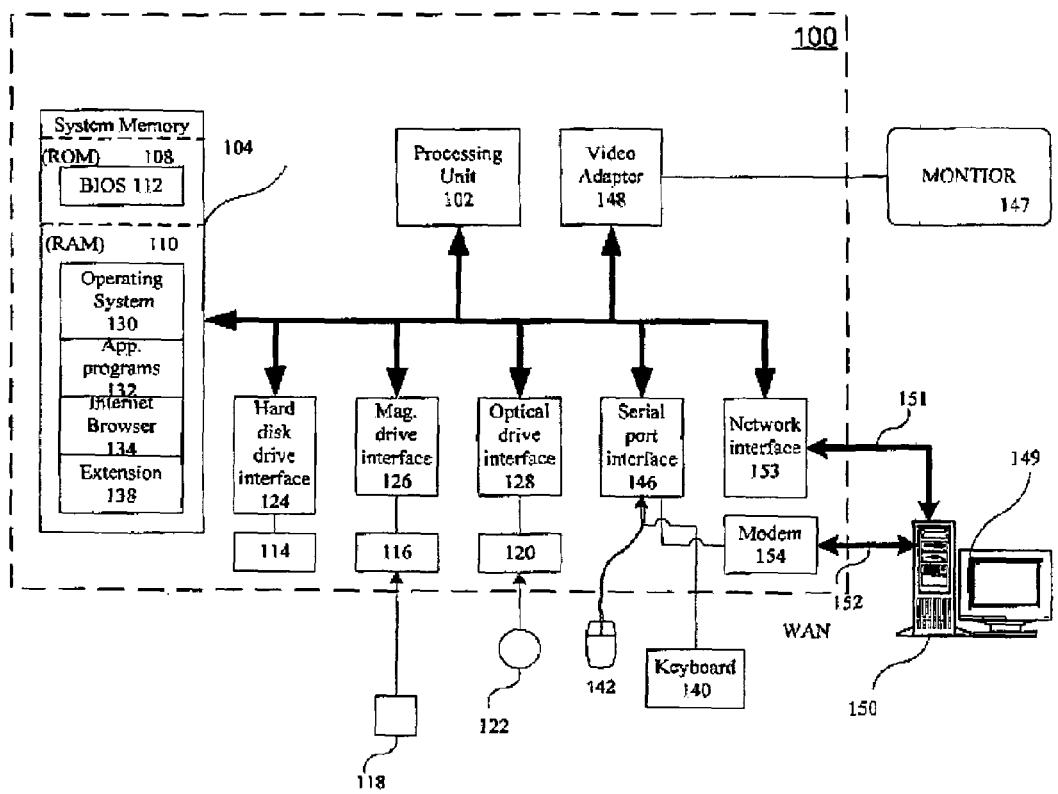
FIG. 1 depicts a high-level block diagram of a data processing system in which a preferred embodiment of the present invention may be implemented.

With reference now to the figures, and in particular with reference to FIG. 1, a high-level block diagram of a system for distributing video content via a network in accordance with a preferred embodiment of the present invention is depicted. An exemplary system for implementing the present invention includes personal computer 100, including processing unit 102, system memory 104, and system bus 106 that couples system memory 104 to processing unit 102. System memory 104 includes read only memory (ROM) 108 and random access memory (RAM) 110. Basic input/output system 112 (BIOS), containing the basic routines that help to transfer information between elements within the personal computer 100, such as during start-up, is stored in ROM 108. Personal computer 100 further includes hard disk drive 114, magnetic disk drive 116, e.g., to read from or write to removable disk 118, and optical disk drive 120, e.g., for reading CD-ROM disk 122 or to read from or write to other optical media. Hard disk drive 114, magnetic disk drive 116 and optical disk drive 120 are connected to system bus 106 by hard disk drive interface 124, magnetic disk drive interface 126, and optical drive interface 128, respectively. The drives and their associated computer-readable media provide nonvolatile storage for personal computer 100. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 110, including operating system 130, one or more application programs 132, such as Internet browser program 134, program data 136, and other program modules (not shown). The Internet browser program 134 may include extension 136 for streaming audio/video content from a web site.

A user may enter commands and information into personal computer 100 through keyboard 140 and pointing device, such as mouse 142. Other input devices (not shown) may include a microphone, joystick, game pad, satellite dish, scanner, or the like. These and other input devices are often connected to the processing unit 102 through serial port interface 146 that is coupled to system bus 106, but may be connected by other interfaces, such as a game port or a universal serial bus (USB). Monitor 147 or other type of display device is also connected to system bus 106 via an interface, such as video adapter 148. In addition to the monitor, personal computers typically include other peripheral output devices (not shown), such as speakers or printers.

Personal computer 100 may operate in a networked environment using logical connections to one or more remote computers, such as remote computer 149. Remote computer 149 may be a server, a router, a peer device or other common network node, and typically includes many or all of the elements described relative to personal computer 100, although only a memory storage device 150 has been illustrated. The logical connections depicted include local area network (LAN) 151 and wide area network (WAN) 152. Such networking environments are commonplace in offices, enterprise-wide computer networks, intranets and the Internet 160.

When used in a LAN networking environment, personal computer 100 is connected to the LAN 151 through network interface 153. When used in a WAN networking environment, personal computer 100 typically includes modem 154 or other means for establishing communications over WAN 152, such as the Internet 160. Modem 154, which may be internal or external, is connected to system bus 106 via serial port interface 146. In a networked environment, program modules depicted relative to personal computer 100, or portions thereof, may be stored in the remote memory storage device. It will be appreciated that the network connections shown are exemplary and other means of establishing a communications link between the computers may be used.

Figure 2A:
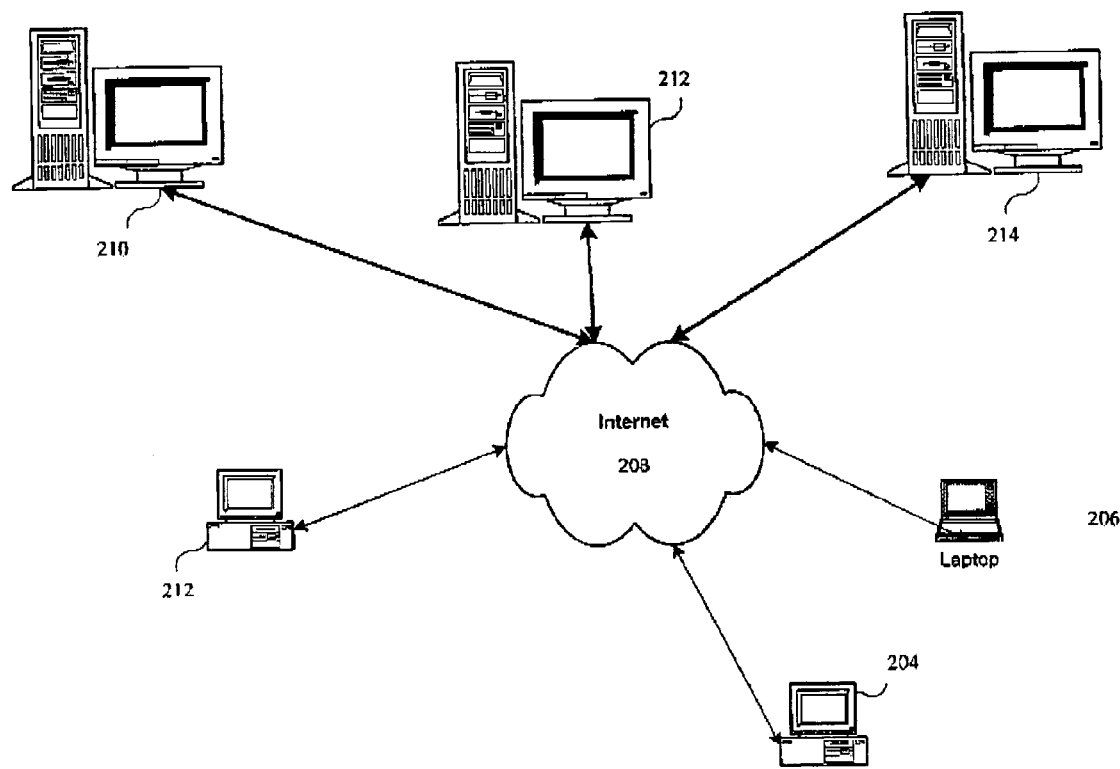
FIGS. 2A–B are high-level block diagrams of a system for distributing video content via a network in accordance with a preferred embodiment of the present invention.

Referring now to FIG. 2A, a high-level block diagram of a system for distributing video content via a network in accordance with a preferred embodiment of the present invention is depicted. System 200 includes user terminals 202, 204 and 206 connected to the Internet 208 via a modem, or other Internet access device(not shown), and inked to at least one of video content servers 210, 212, and 214 via the internet 208. Video content, in this treatment, is defined as a series of connected video presentations that when transmitted in a specific order, provide a complete story or presentation with a beginning, middle and ending.

In a preferred embodiment, user terminals 202, 204 and 206 each represent multiple subscribers dispersed throughout the world. In this embodiment, user terminal 202 represents subscribers that have registered as Tier 1 subscribers; user terminal 204 represents subscribers that have registered as Tier 2 subscribers and user terminal 206 represents subscribers that have registered as Tier 3 subscribers. Content servers 210, 212 and 214 store and dispense video content to each of the tiers via Internet/network 208 as requested by user terminals 203, 204, and 206. Server 212 may be one of many servers that provide video content for the subscribers. As those skilled in the art will appreciate, content may be stored on multiple servers within a common website or on multiple servers on multiple websites. Depending on the configuration, specific video content may be accessed by subscribers who may then be passed to successive servers to accommodate requests for video service.

Figure 2B:
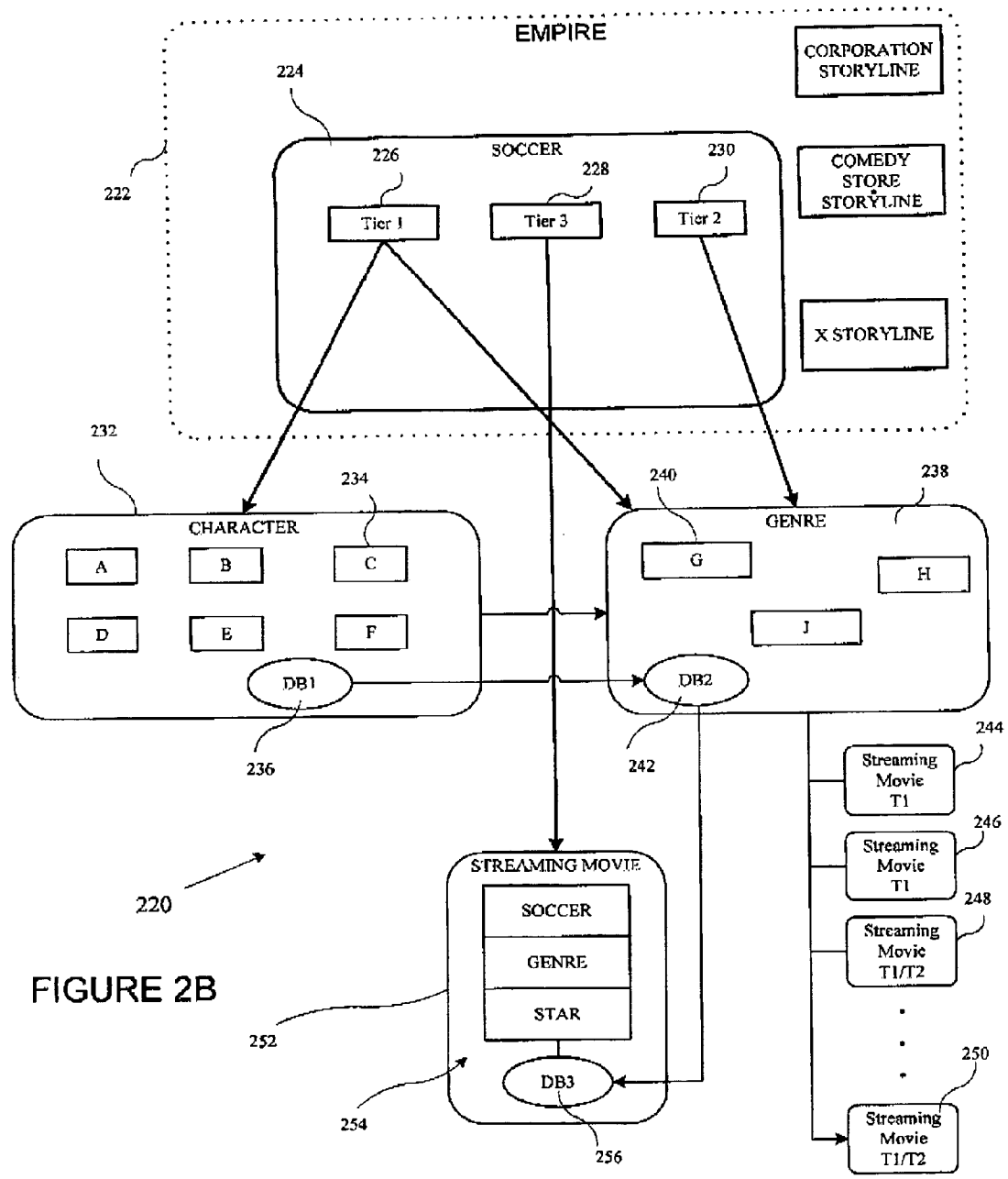

Referring now to FIG. 2B, a high-level block diagram of the screen displays in accordance with a preferred embodiment of the present invention is illustrated. Distribution system 220 is shown with multiple display screens 241 246, 248, and 250. Each subscriber may login to home screen 222 of the distribution system which is shown here as "Empire". Empire is an example of a video presentation of utilizing the present invention. In no way does the use of the Empire example limit the distribution system of the present invention, to movies and the like. Audio stories, anime, text, etc., are all capable of being distributed in the same fashion.

A subscriber accesses Empire 222 home page and is presented with a choice of three tiers of access: Tier 1 (T1) 226, Tier 2 (T2) 230 and Tier 3 (T3) 228. T1 226 is a premium tier that allows the subscriber the most choices in determining content of a presentation. T2 228 is also a premium tier but with a different type and number of choices available to a subscriber. TS 230 is a non-premium tier in which a subscriber may view only the content that has been determined by the premium tiers.

An example of subscription fees may be in order at this point. Fees are determined by the content provider, but in general, the cost of a tier subscription rises as the choices of content increase. For example, a T1 226 subscriber may pay $3 a week, a T2 230 subscriber may pay $2 a week and a T3 228 subscriber may pay $1 per week to receive the content of the web site. The content of Soccer 224 storyline, in this example, is of a soccer team owned by the Empire Corporation. It features an aging soccer star as a key character in the soccer story. In order to present not just a single story, different views of the star's story may be viewed by making choices in different categories. In this example, T1 226 subscribers have a choice of one of six additional stars to pair with aging soccer star. The choices of T1 226 subscribers are recorded in a database. Each choice now has a number of subscribers that have picked an additional character. A trend analysis of the choices made by T1 226 subscribers are then sent to a similar database on board Genre 238 server. The procedure is repeated when the choices of the T1 226 and T2 228 subscribers are analyzed for TS 230.

All data of each portion of the present invention may be located on one server at one web site, on multiple servers at multiple web sites or even duplicate content on multiple servers at multiple web sites. A web site may be any where in the world and probably the most overriding need for locating the content is reliability and bandwidth available at the connection.

Character 232 and genre 238 are small databases containing only descriptions, photographs and any other information necessary for a T1 subscriber to make a choice. All the choices of the T1 subscribers are recorded in Database 1 (DR1) 236. After a predetermined period of time, the choice database information is transmitted to DB2 242. The character, for instance "B" is the star that has the highest total T1 226 subscribers in the predetermined time. B is used as the star that will be required in the genre choices made by T2 230 subscribers. After picking the character of the content/ presentation to be broadcast, a T1 subscriber is then linked to a second choice, in this case genre 238.

Genre 238, in the present embodiment is a type of movie, e.g., drama, comedy, action, etc. T1 226 subscribers now have a choice of what part of the Soccer story with B as a co-star in the show, is viewed. Soccer is about an aging soccer star and the present invention doesn't just give a viewer a particular portion of the soccer star's life. Soccer star may be picked to interact with a comedy actor and the genre may be a comedy. The content viewed would be a comedy starring Soccer star and B the comedy actor. Or, in a drama with B, it would be a different part of Soccer star's life.

After T1 226 has made a choice and been transferred to Genre 238, T1 226 makes a choice of genre. In this example the majority of T1 226 users choose the genre "J" or comedy. T2 subscribers that have chosen the soccer story line are choosing a movie genre at the same time, with a few seconds delay, as T1 is choosing characters. All T1 subscribers all have choices as to both character and genre, so T1 subscribers may see the content in the form that they choose. T2 subscribers must take the majority choice of B as generated by DB1 236 and transmitted to DB2 242. The information gathered by both DB1 236 and DB2 242 is used by the system to generate the necessary choices for Tier 3 228, which has no choice but that of Soccer 224 with character B and qenre J.

Tier 3 228 subscribers pay the least fee, so the character and genre is chosen for them by the choices made by T1 and T2 subscribers. When a T3 228 subscriber logs in, the subscriber is linked directly to a streaming movie, which has the character and genre already determined. It is determined by the combined totals of T1 226 and T2 230 choices. DB1 236 data is combined with DB2 242 data and the combination of the T1 226 and T2 230 choices for genre are transmitted to DB3 256. The choice of character is determined by the T1 selections and the choice of genre is determined by both T1 226 and T2 230 selections. At login T3 subscribers are linked to movie site 252, containing content 254, which has been determined by the choices made by T1 226 and T2 230.

A trend analysis program is applied to DB1 236 and DB2 242 as T1 and T2 subscribers begin logging on and within a predetermined period of time, a trend can be determined. The trend analysis in both databases is utilized to determine a link to the appropriate content for T3 228 subscribers. A random choice as to character and genre is provided by the database and trend analysis programs if there is not enough data to provide a true trend. The link is then applied to the T3 228 link on Soccer 224 home page.

On the other hand, T1 226 subscribers and T2 230 subscribers are directed to a specific link only after making the choices to which they are entitled. There are combinations in which T1 226 subscribers and T2 230 subscribers will be linked to the same streaming movie site such as movie site 248 and movie site 250 because they have chosen the same genre. T1 is not restricted by T2, but T2 is restricted to genre choices only. It is possible that a T1 subscriber would choose movie 244 or movie 246, both of which may have the same genre but a different co-star.

T1 subscribers have the choice of star and genre and T2 subscribers utilize the T1 choice of star and pick their own genre. T3 subscribers are linked to the site that is determined by trend analysis to have the most selected star and most selected genre (totals of both T1 and T2 are used). As pointed out above, the content is prepared in advance for each possible combination of stars and genre, loaded onto a server and provided an address for linking to choices made by each Tier. Higher premiums are required by the different tiers for a subscriber to have more choices as to which combination is viewed.

Figure 3:
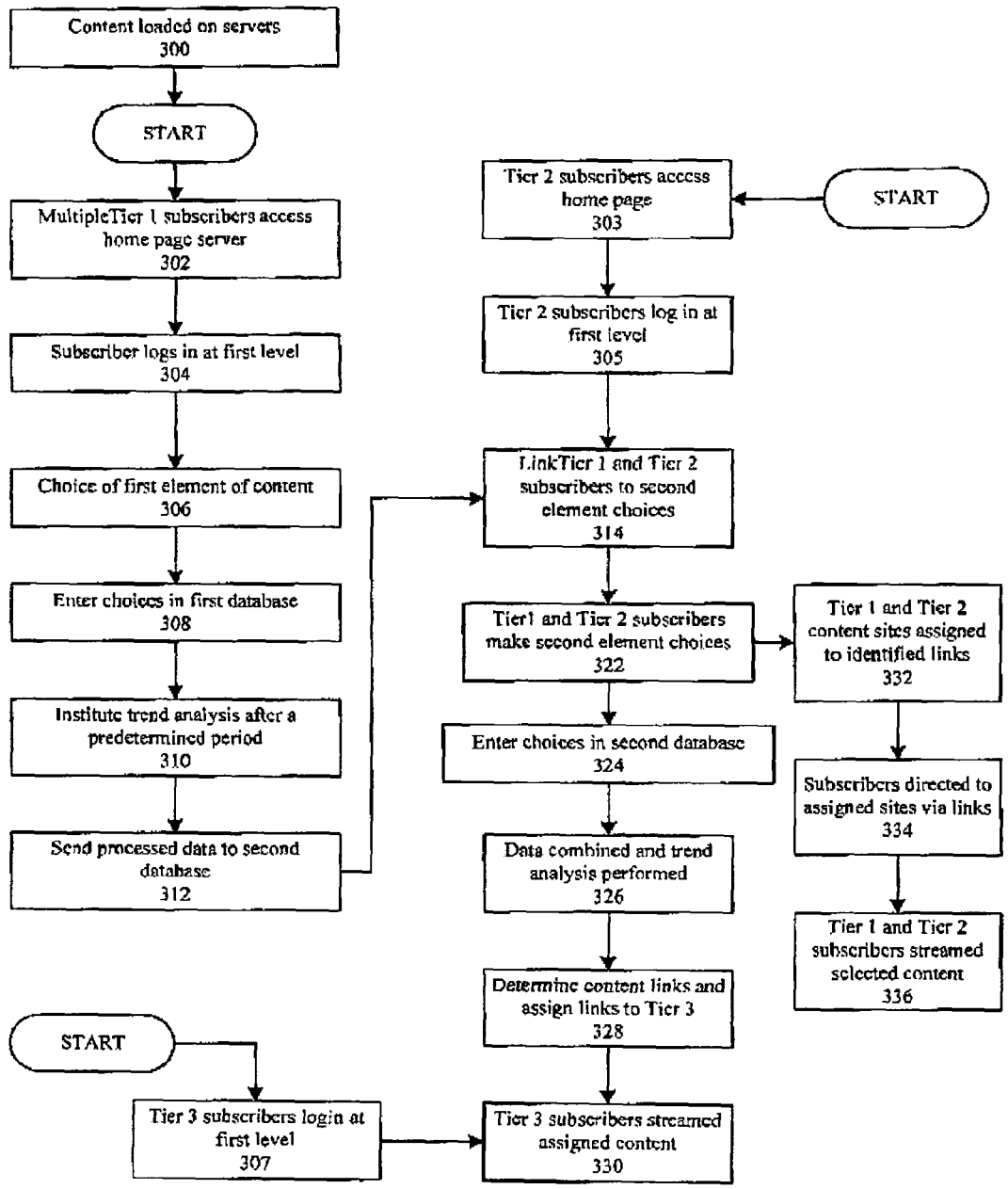
FIG. 3 depicts a high-level process for distributing content via a network in accordance with a preferred embodiment of the present invention.

Referring to FIG. 3, a process for distributing content via a network, including the Internet, in accordance with a preferred embodiment of the present invention, is depicted. The process begins with step 300, which illustrates content being loaded onto servers at designated web sites controlled by the content supplier. Additionally, Tier 2 and Tier 3 subscribers login to the home page at steps 303 and 307 respectively (see FIG. 2). The process for Tier 3 subscribers proceeds to step 330, which depicts the Tier 3 subscribers being linked to a content location containing the content determined by Tier 1 and Tier 2 subscribers. The process for Tier 2 subscribers passes from step 303 to step 305 which illustrates Tier 2 subscribers logging in at a first level in the Tier 2 login location (see FIG. 2)

Content comprises, as discussed earlier, combinations of each possible choice in a storyline, presentation, treatment, etc., that may be chosen by subscribers to the supplier's service. The process proceeds to step 302, which depicts a subscriber accessing the home web site of the content supplier. The process then passes to step 304, which illustrates the subscriber clicking on a designated link for access to the content. Both passwords and cookies (Internet identification devices that are sent to a user's browser) may be used or any other identity-confirming device may be used to confirm the identity of the subscriber.

The process continues to step 306, which depicts the subscriber, in this case a premium subscriber, being directed to a plurality of choices of elements (stars, location, time, etc.). The process then passes to step 308, which illustrates the choice being entered into a first database. The process continues with step 310, which depicts the choices of all the subscribers being tallied in a database for trend analysis. Next, the process proceeds to step 312, which illustrates sending the totals to a second database associated with a second set of choices of elements (text, genre, video, etc.) The totals transmitted by the first database are utilized in a second database to determine a trend for both sets of elements. The process continues to step 326, which illustrates combining and analyzing the trends of both databases combined.

Returning to step 306, the process proceeds in parallel to step 314, which depicts Tier 1 subscribers being linked to second element choices. Tier 2 subscribers are linked to the second element choices from login. The process then passes to step 322, which illustrates Tier 1 and Tier 2 subscribers making the second element choices presented to them. The process proceeds in parallel to steps 324 and 332. The process then moves to step 332, which depicts Tier 1 and Tier 2 subscribers being linked to the sites containing the content determined by each subscriber's choice and the subscribers start receiving the selected content via the Internet (network).

Returning to step 322, the second branch of the process continues to step 324, which illustrates the Tier 1 and Tier 2 choices being entered into a database. The Tier 1 first element choice that is chosen by most of the Tier 1 subscribers is the first element of Tier 2 subscribers. However, second elements are chosen by Tier 1 and Tier 2 subscribers and the second element that is chosen by the majority of both Tier 1 and Tier 2 subscribers is the second element selection for Tier 3 subscribers.

The process passes to step 326, which depicts the data from the first and second databases being combined and a trend analysis being performed. The trend analysis is based on the first few seconds of logins in both Tier 1 and Tier 2. The process may be utilized in a local area network and a Wide area network. However, in the case of the Internet, the worldwide connections provide, potentially, thousands of hits in a short period of time, which can provide enough data to predict an outcome. The process then passes to step 328, which illustrates the system assigning content links to the Tier 3 subscribers. The process continues to step 330, which depicts the Tier 3 subscribers receiving the assigned content.

The present invention provides a fee-based structure for distributing content over a network, including the Internet. Content is prepared for all combinations of at least two sets of variable elements. The content is then stored and given Universal Resource Locator (URL) addresses. The system then receives logins from various levels of subscribers and directs them, via links, to content made available to them because of the paid membership and the particular choices they make on each login. The choices of a first element is made by a first tier of subscribers and the choices of a second element are made by a second tier of subscribers. The choices are analyzed and the first element most selected and the second element most selected are then directed to the third tier of subscribers.

The number of levels and elements increase the combinations and complexity of the system. However, in order to present a basic system with few steps, a movie with multiple combinations of elements on only two levels were described.

The Internet is evolving so that there may soon be an improved method of transmitting data that outstrips the current methods of optical fiber, satellite, copper twisted pair, cable, wireless and delivery modes including ATM, TCP/IP, etc. Content delivery mechanisms may change in the future, but the present invention utilizes user choices of variables to deliver specific content. Trend analysis is performed in the first few seconds of the subscriber logins and that information is then transmitted to a subsequent level subscriber. At the same time, the choice of the first level subscriber influences delivery of content to at least one different level user of the same service.

While the invention has been particularly shown and described with reference to a preferred embodiment, it will be understood by those skilled in the art that various changes in form and detail may be made therein without departing from the spirit and scope of the invention.

What is claimed is:

1. A method for distributing content on a network, comprising the steps of:
   storing a plurality of versions of a single content presentation wherein each said version of said single presentation is classified according to one of a plurality of descriptions including: theme, star, genre, story line and supporting characters with each description linking to one of the plurality of versions at unique network address;
   authorizing access to a first database containing a listing of presentations, by a first level subscriber according to predetermined requirements, wherein the first level subscriber selects one presentation from the listing of presentations;
   linking the first level subscriber to a first one of the plurality of descriptions associated with the selected one presentation;
   linking the first level subscriber to a second one of the plurality of descriptions associated with the selected one presentation and subsequently linking the first level subscriber to any additional associated descriptions if required by the first level subscriber;
   linking the first level subscriber to the unique address associated with the combination of selections by the first level subscriber; and
   monitoring, for a predetermined period, the number of accesses by a group of said first level subscribers and second level subscribers for determining which version of the presentation will be linked to third level subscribers.

2. The method as set forth in claim 1 wherein access to each said unique network address is determined by selections compiled from at least one of the first level or the second level subscribers.

3. The method as set forth in claim 1, wherein each of said plurality of versions of a single presentation are each stored on at least one server that is accessible via respective said unique network addresses.

4. The method as set forth in claim 1, further comprises:
   storing selection data associated with a first set of selections;
   storing selection data associated with a second set of selections; and
   utilizing selection data from said first set and said second set of selections to determine selection trends of said first level subscribers and said second level subscribers.

5. The method as set forth in claim 1, further comprising:
   analyzing the selections made by said first level subscribers in order to set a first selection for said second level and third level subscribers; and
   utilizing said analysis of said selections made by said first level subscribers and the selections made by said second level subscribers to determine a network address wherein a said third level subscribers can access the selection determined by the trend analysis.

6. The method of claim 1 wherein said network is the Internet.

7. A system for distributing content on a network, comprising:
   storage interconnected to said network for storing a plurality of versions of a single presentation of the content wherein each said version of said single presentation is classified according to one of a plurality of descriptions including theme, star, genre, story line and supporting characters, with each description linking to one of the plurality of versions at unique network address;

an interface utilized for authorized access to a first database containing a listing of presentations, by a first level subscriber according to predetermined requirements, wherein the first level subscriber selects one presentation from the listing of presentations;

linking the first level subscriber to a first one of the plurality of descriptions associated with the selected one presentation subsequently linking the first level subscriber to a second one of the plurality of descriptions associated with the selected one presentation and subsequently linking the first level subscriber to an additional associated descriptions if required by the first level subscriber;

linking the first level subscriber to the unique address associated with the combination of selection is by the first level subscriber; and circuitry for monitoring, for a predetermined period, the number of accesses by a group of said first level subscribers and second level subscribers for determining which version of the presentation will be linked to third level subscribers.

8. The system as set forth in claim 7 further comprising a multi-level subscriber database, wherein access to each said unique network address is determined by selections compiled from at least one of the first level or second level subscribers.

9. The system as set forth in claim 7, wherein each of said plurality of versions of a single presentation are each stored on at least one server that is accessible via respective said unique network addresses.

10. The system as set forth in claim 7, further comprises:
a first database for storing selection data associated with a first set of selections;
a second database for storing selection data associated with a second set of selections; and
at least a third database for utilizing selection data from said first set and said set of selections to determine selection trends of said first level subscribers and said second level subscribers.

11. The system as set forth in claim 7, further comprises:
an analyzing means for analyzing the selections made by said first level subscribers in order to set a first selection for said second level subscribers; and
a means for utilizing said analysis of said selections made by said first level subscribers and the selections made by said second level subscribers of choices to determine a network address wherein a third level of subscribers can access the selection determined by the trend analysis.

12. The system of claim 7 wherein said network is the Internet.

13. A computer program product, within a computer readable medium, having instructions for distributing content on a network, comprising:
instructions within said computer program product for storing a plurality of versions of a single presentation wherein each said version of said single presentation is classified according to one of a plurality of descriptions including theme, star, genre, story line, and supporting characters with each description linking to one of the plurality of versions at a unique network address;

instructions within said computer program product for authorizing access to a first database containing a listing of presentations, by a first level subscriber according to predetermined requirements, wherein the first level subscriber selects one presentation from the listing of presentations;

instructions within said computer program product for linking the first level subscriber to a first one of the plurality of descriptions associated with the selected one presentation;

instructions within said computer program product for linking the first level subscriber to a second one of the plurality of descriptions associated with the selected one presentation and subsequently linking the first level subscriber to any additional associated descriptions if required by the first level subscriber;

instructions within said computer program product for linking the first level subscriber to the unique address associated with the combination of selections by the first level subscriber;

instructions within said computer program product for monitoring, for a predetermined period, the number of accesses by a group of said first level subscribers and second level subscribers for determining which versions of the presentation will be linked to third level subscribers.

14. The computer program product as set forth in claim 13 wherein access to each said unique network address is determined by selections compiled from at least one of the first level or the second level subscribers.

15. The computer program product as set forth in claim 13, wherein each of said plurality of versions of a single presentation are each stored on at least one server that is accessible via respective said unique network addresses.

16. The computer program product as set forth in claim 13, further comprises:
instructions within said computer program product for storing selection data associated with a first set of selections; and
instructions within said computer program product for storing selection data associated with a second set of selections; and
instructions within said computer program product for utilizing selection data from said first set and said second set of selections to determine selection trends of said first level subscribers and said level subscribers.

17. The computer program product as set forth in claim 13, further comprises:
instructions within said computer program product for analyzing the selections made by said first level of subscribers in order to set a first selection for said second level and said third level subscribers; and
instructions within said computer program product for utilizing said analysis of said selections made by said first level subscribers and the selections made by said second level subscribers to determine a network address wherein said third level subscribers can access the selection determined by the trend analysis.

18. The computer program product of claim 13 wherein said network is the Internet.

* * * * *